United States Patent
Matsuura et al.

(10) Patent No.: US 7,320,054 B2
(45) Date of Patent: Jan. 15, 2008

(54) MULTIPROCESSOR SYSTEM HAVING A SHARED MEMORY

(75) Inventors: Hirokazu Matsuura, Kawasaki (JP);
Takao Murakami, Kawasaki (JP);
Kazuya Uno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 206 days.

(21) Appl. No.: 10/720,315

(22) Filed: Nov. 24, 2003

(65) Prior Publication Data
US 2004/0107323 A1    Jun. 3, 2004

(30) Foreign Application Priority Data
Nov. 28, 2002  (JP) ............................. 2002-345371

(51) Int. Cl.
*G06F 12/00*     (2006.01)
(52) U.S. Cl. .................. 711/141; 711/129; 711/130; 711/146; 711/147; 711/148; 711/152; 711/163
(58) Field of Classification Search ............... 711/141, 711/146, 147, 148, 129, 130, 152, 163
See application file for complete search history.

(56) References Cited
U.S. PATENT DOCUMENTS
6,622,216 B1 *  9/2003  Lin ............................. 711/141

FOREIGN PATENT DOCUMENTS
JP   6-274415   9/1994

* cited by examiner

*Primary Examiner*—Donald Sparks
*Assistant Examiner*—Mehdi Namazi
(74) *Attorney, Agent, or Firm*—Katten Muchin Rosenman LLP

(57) ABSTRACT

Disclosed is a multiprocessor system in which even if contention occurs when a common memory is accessed from each of a plurality of processors, the number of times the common memory is accessed is capable of being reduced. The common memory of the multiprocessor system is provided with a number of data areas that store data and with a control information area that stores control information indicating whether each of the data areas is in use, and each processor is provided with a storage unit equivalent to the common memory and with an access controller. The access controller of a processor that does not have access privilege monitors data and addresses that flow on the common bus, accepts data written to the common memory and data read from the common memory, and stores this data in the storage unit of its own processor, thereby storing content identical with that of the common memory.

7 Claims, 17 Drawing Sheets

MULTIPROCESSOR SYSTEM HAVING A SHARED MEMORY

BACKGROUND OF THE INVENTION

This invention relates to a multiprocessor and, more particularly, to a multiprocessor system having a shared memory.

FIG. 9 is a diagram showing the configuration of a mobile communications system. The system includes a stationary network 1 comprising local telephone switches 1a, 1b, a tandem switch 1c and a gateway switch id, etc., and a mobile network 2 comprising a mobile gateway switch 2a, a home location register (HLR) 2b, which manages subscriber class and location registration information for the purpose of providing service to mobile units, and a mobile switch 2c that refers to the home location register (HLR) 2b to decide base-station controllers (RNC) 3a, 3b, which carry out wireless control.

The base-station controllers (RNC) 3a, 3b are connected to the mobile switch 2c, which is a host device, and to a multimedia signal processor (MPE) 4, and have a function for executing processing in accordance with a command and a function for sending and receiving data to and from base stations 5a, 5b. Each of the base stations 5a, 5b communicates wirelessly with a number of user devices (mobile stations) 6a, 6b present in the cell that is under the control of the base station. A stationary telephone 7 is connected to the stationary network 1, and a PHS base station 9 is connected to the stationary network 1 via a PHS adapter 8.

Each of the base station controllers 3a, 3b is implemented by a multiprocessor. FIG. 10 illustrates the multiprocessor structure of each base station controller from which portions for sending and receiving signals to and from the outside have been omitted. Connected to a G bus 10 serving as a common bus are a bus arbiter (BCONT) 11 for performing bus allocation control, a plurality of processors (CPU #1 to CPU #n) $12_1$ to $12_n$, and a common memory card (CM) 13. The processors CPU #1 to CPU #n are identically constructed and each has a microprocessing unit (MPU) 21 and an access controller (LSI) 22 for controlling access to the common memory card (CM) 13. The common memory card (CM) 13 has a common memory 23 comprising a RAM, and a common-memory controller (CM controller) 24. The common memory 23 has a data storage section GM equipped with a number of data storage areas A to N, and an exclusive control data storage section (semaphore register) semf for retaining whether respective ones of the storage areas A to N are presently in use or not as well as the names of processors presently in use. A storage area for which a busy flag has been set cannot be accessed by another processor.

The bus arbiter 11 and the processors CPU #1 to CPU #n are connected by respective ones of signal lines in the manner shown in FIG. 11. When the bus is not in use, each processor requests the privilege to use the bus by sending a bus-use request signal *BREQj from its signal line to the bus arbiter 11. If the right to use the bus is to be given to a prescribed processor, the bus arbiter 11 sends a bus-use enable signal *BGNTj to this processor. It is required that a processor output a bus busy signal *BB during a data transfer. Other buses refer to the bus busy signal *BB and cannot use the bus if it is in use.

In a case where a prescribed processor, e.g., processor CPU #n, is to acquire the bus-use privilege and access data storage area GM-A of data storage section GM, the processor sets a busy flag (exclusive control flag) in the corresponding storage area a of the corresponding semaphore register semf if the data storage area GM-A is not in use. The processor CPU #n thenceforth accesses the data storage area GM-A and reads out or writes data. If it becomes unnecessary to access the data storage area GM-A, then the processor clears the exclusive control flag that has been stored in the storage area a of the semaphore register semf. As a result, the other processors CPU #1 to CPU #n-1 are capable of accessing the data storage area GM-A.

With the conventional method of accessing the common memory card CM by multiprocessor processing according to the prior art, it is required that other processors CPU #1 to CPU #n-1 that desire to access the data storage area GM-A being used by the processor CPU #n read the content of the semaphore register semf whenever the bus-use privilege is obtained and check to determine whether the exclusive control flag corresponding to the data storage area GM-A has been set. If the exclusive control flag has been set, the processors similarly determine, upon elapse of 2 μs, whether the exclusive control flag has been set and subsequently issue the common memory card CM a read instruction, which is for reading the semaphore register semf, endlessly until the flag is cleared. As a consequence, not only does the number of times the bus is accessed (the number of times the bus is used) become very large, as shown in FIG. 12, but there is also a sharp increase in rate of CPU use owing to the increase in the number of times access processing (limitless retry) is executed. This means that the original performance of the apparatus cannot manifest itself fully.

FIGS. 13 to 17 are diagrams useful in describing control for accessing the common memory card CM according to the prior art. The number of processors is assumed to be two, namely CPU #0 and CPU #1, in order to simplify the description. The semaphore register (exclusive control data storage unit) semf manages the right to access the data storage areas A to N in the common memory and uses ① the number of the CPU that has acquired the access privilege and ② an acquisition flag (exclusive control flag) as management information. With regard to the address range of the common memory CM managed by the semaphore register semf, it is so arranged that semf-a, semf-b, . . . , semf-n manage data storage areas GM-A, GM-B, . . . , GM-N, respectively.

Processing is executed as described below in order to acquire the right to access a prescribed storage area. Reference should be had to FIG. 13.

① The MPU 21 within CPU #0 generates a read access for the purpose of semaphore acquisition. The target at this time is semf-a, which is in the semaphore register semf of common memory 23.

② The access controller (LSI chip) within CPU #0 receives the access request of step ①, sends the read access to the common bus 10 and waits for the common memory card CM to send back the result of acquisition of semf-a.

③ The CM controller 24 receives the read access sent on the common bus and reads out the data of semf-a pertaining to this access.

④ If the read-out data of semf-a is not in use, then the CM controller 24 adds on management information such that CPU #0, which is the source of the current access, will be rendered busy, and writes the result back to semf-a. As a consequence, semf-a attains a state indicating that CPU #0 is busy.

⑤ The CM controller 24 sends the management information, which was written back to semf-a, on the common bus as loop data. The loop data indicates that acquisition by CPU #0 has succeeded.

⑥ The access controller 22 of CPU #0 receives the data sent back on the common bus, relays it to the MPU 21 and completes semaphore acquisition processing. At this time the CPU #0 will have acquired the right to access data area GM-A.

If the right to access data area GM-A corresponding to semf-a is acquired by the above processing, then CPU #0 commences access, as shown in FIG. 14.

① CPU #0 starts executing processing. If it becomes necessary to read data from or write data to data area GM-A of common memory 23 in the course of processing, then access to the data area GM-A is sent from MPU 21.

② The access controller 22 receives the access of step ①, sends read access to the common bus 10 and waits for data read out of the data area GM-A of common memory card CM to be sent back. It should be noted that read access is described as an example.

③ The CM controller 24 receives the read access sent on the common bus.

④ The CM controller 24 reads data out of the data-area GM-A pertaining to this read access. In the case of write, the CM controller 24 receives the data that is on the bus and writes this data to the data area GM-A.

⑤ The CM controller 24 sends the read-out data to the common bus as loop data.

⑥ The access controller 22 of CPU #0 receives the data sent back on the common bus and relays it to the MPU 21.

Steps ① to ⑥ are repeated thenceforth until the processing by CPU #0 ends. The data in data area GM-A is updated whenever a write access is generated.

If it becomes unnecessary for CPU #0 to access data area GM-A, terminate processing is executed as shown in FIG. 15.

① If processing by CPU #0 ends, the MPU 21 sends release access to semf-a in order to relinquish the right to access the data area GM-A. That is, the MPU 21 accesses semf-a to write data 0.

② This write access is received temporarily by the access controller 22, which then sends a terminate report to the MPU 21. At this time processing on the side of the MPU is completed but post-processing is executed by the access controller 22.

③ Upon receiving the write access, the access controller 22 sends write access directed to semf-a out on the common bus.

④ The CM controller 24 receives the access (write access and data) sent out on the common bus.

⑤ The CM controller 24 writes the receive write data (=0) to semf-a of the semaphore register semf to restore semf-a to the unused state. As a result, a state in which other CPUs can access the data area GM-N is attained.

By virtue of this series of processing steps, CPU #0 is capable of updating data area GM-A of the common memory card CM.

Processing illustrated in FIG. 16 is executed if a read access for semaphore acquisition is generated by CPU #1 in a state in which access to data area GM-A corresponding to semf-a has been acquired by CPU #0 through the operation shown in FIG. 13.

① The MPU 21 within CPU #0 outputs a read access for the purpose of semaphore acquisition. The target at this time is semf-a, which is in a semaphore register in common memory 23.

② If the access controller within CPU #1 receives the access request of step ①, then the access controller 22 sends the read access to the common bus 10 and waits for the common memory card CM to send back the result of acquisition of semf-a.

③ The CM controller 24 receives the read access sent on the common bus and reads out the data of semf-a pertaining to this access.

④ Next, the CM controller 24 determines whether the read data in semf-a is in use. Since the data is in use, semaphore acquisition by the CPU #1 that was the source of the access fails. It should be noted that since CPU #0 is busy, no particular write-back processing for management information is executed and semf-a is such that the busy state of CPU #0 remains as is.

⑤ The CM controller 24 sends information indicative of semf-a acquisition failure to CPU #1 on the common bus as loop data.

⑥ The access controller 22 of CPU #1 receives the data sent back on the common bus and relays it to the MPU 21.

At this time CPU #1 fails to acquire the right to access data area MG-A corresponding to semf-a and subsequently repeats retry access until semf-a (the right to access data area MG-A) can be acquired.

In a case where the right to access data area MG-A corresponding to semf-a has already been acquired by CPU #0 and CPU #0 is currently accessing data area GM-A, the following processing illustrated in FIG. 17 is executed when CPU #1 repeats retry access to acquire the right to access semf-a: Access processing by CPU #0 is the same as the processing of steps ① to ⑥ in FIG. 14. If semaphore-acquisition retry access by CPU #1 occurs in between periods of processing by CPU #0 under these conditions, the processing of steps ⑦ to ⑫ (which correspond to steps ① to ⑥ in FIG. 16) is executed. As a consequence, the common bus 10 is put under pressure.

As a result, access that is output from CPU #0 is delayed and so is processing for relinquishing semf-a that has been acquired by CPU #0. In addition, semaphore-acquisition retry access from CPU #1 occurs during this period as well, as a result of which processing by both CPU #0 and CPU #1 is delayed.

The specification of Japanese Patent Application Laid-Open No. 6-274415 discloses a multiprocessor system having a common memory. In this multiprocessor system, each processor is provided with a cache memory. When a processor accesses the common memory, the type of access (read or write) and either read-out data or write data are stored in the cache memory. When another device writes data to the common memory, the data in the cache memory is invalidated. By adopting this arrangement, consistency between the common memory and cache memory can be maintained without monitoring the state of the bus. Moreover, the common memory need not be accessed if a hit is achieved with regard to the data that has been stored in the cache memory.

In the conventional multiprocessor system illustrated in FIGS. 10 to 17, the number of bus accesses (the number of times the bus is used) becomes very large, access output from a processor during use is delayed and so is processing for relinquishing the semf-a that has been acquired. Furthermore, an increase in the number of times access-retry processing is executed invites a sudden increase in rate of CPU use and lowers throughput.

Though the multiprocessor system described in the specification of Japanese Patent Application Laid-Open No. 6-274415 is advantageous in terms of provision of the cache memory, it does not provide a solution when contention occurs in accessing a common memory.

SUMMARY OF THE INVENTION

Accordingly, an object of the present invention is to so arrange it that even if contention occurs in accessing a common memory from each of a plurality of processors, the processors can manifest their capabilities fully by reducing the number of times the common memory is accessed.

The present invention provides a multiprocessor system in which a common memory and a number of processors are connected via a common bus, and only one processor is allowed to access the same data area of the common memory. In this multiprocessor system, ① the common memory is provided with a number of data areas that store data and with a control information area that stores control information indicating whether each of the data areas is in use; ② each processor is provided with a storage unit equivalent to the common memory and with an access controller; and ③ the access controller of a processor that does not have access privilege monitors data and addresses that flow on the common bus, accepts data written to the common memory and data read from the common memory and stores this data in the storage unit of its own processor. More specifically, identical addresses are allocated to the address spaces of the storage unit of each processor and of the common memory, and the access controller of a processor that does not have access privilege writes data on the common bus to a storage area of its own storage unit designated by an address on the common bus.

By adopting the arrangement set forth above the content of the storage unit of each processor and the content of the common memory can be made the same. As a result, a processor that has not acquired the right to access a data area can ascertain whether another processor is using this data area merely by referring to its own storage unit. This means that it is unnecessary to query the common memory via the common bus each time, as is done in the prior art, thereby allowing processor throughput to be raised and making it possible to acquire results in a short period of time.

Further, since the common bus can be made to assume the busy state less often, a processor that has acquired access privilege is capable of reading data out of the common memory and writing data to the common memory at high speed.

Further, in the multiprocessor system of the present invention, a processor that has acquired the right to access a prescribed data area need not access the common memory if a hit is achieved in its own storage unit. This data can be read out of the storage unit and processed at high speed, enabling the throughput of the processor to be improved.

Other features and advantages of the present invention will be apparent from the following description taken in conjunction with the accompanying drawings.

DESCRIPTION OF THE PREFERRED EMBODIMENTS

(A) First Embodiment (a) Configuration of Multiprocessor System

Figure 1:
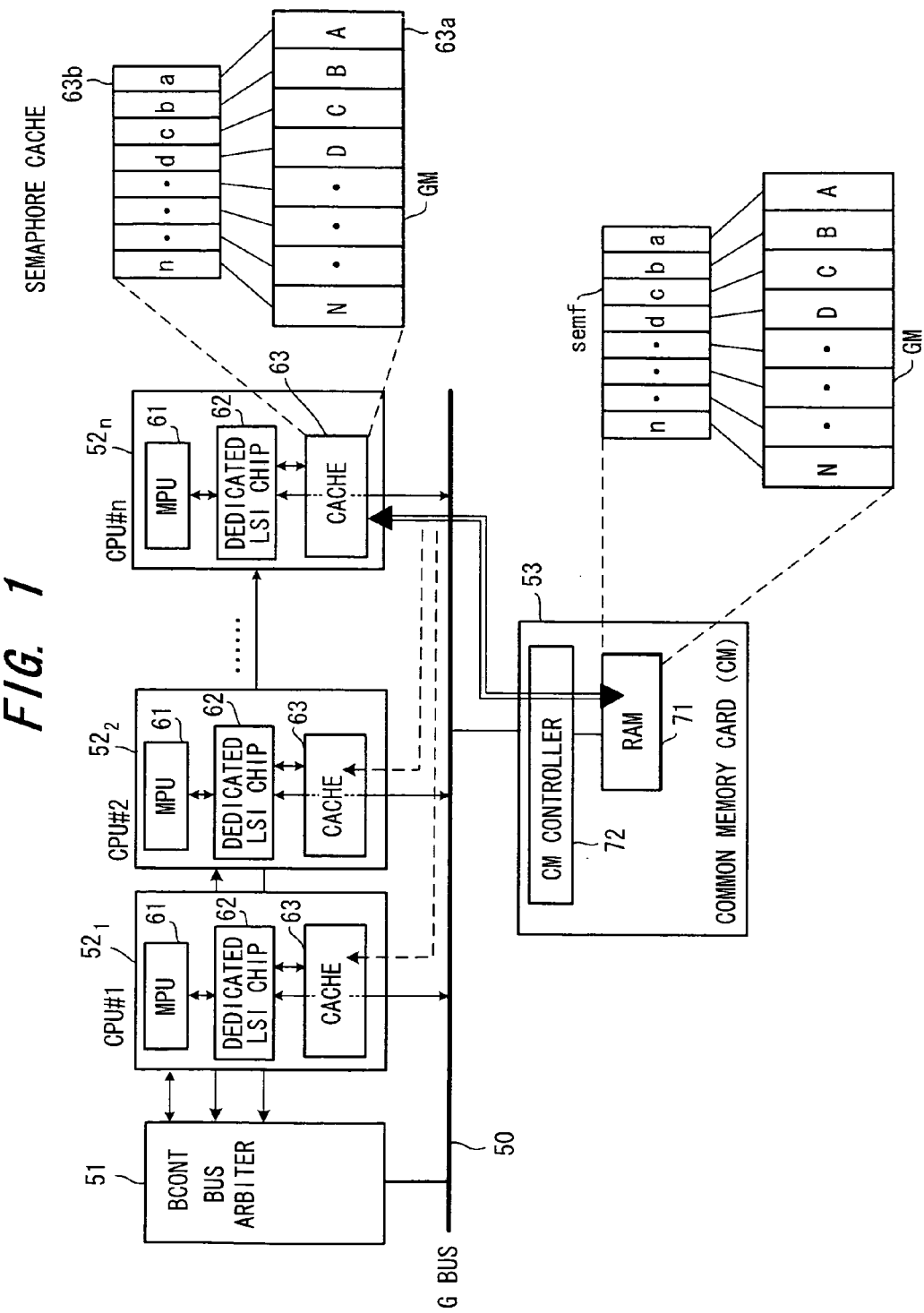
FIG. 1 is a diagram illustrating the configuration of a multiprocessor system according to a first embodiment of the present invention.

FIG. 1 is a diagram illustrating the configuration of a multiprocessor system according to a first embodiment of the present invention.

Connected to a G bus 50 serving as a common bus are a bus arbiter (BCONT) 51 for performing bus allocation control, a plurality of processors (CPU #1 to CPU #n) 52$_1$ to 52$_n$, and a common memory card (CM) 53. The processors CPU #1 to CPU #n are identically constructed and each has a microprocessing unit (MPU) 61, an access controller (dedicated LSI chip) 62 for controlling access to the common memory card (CM) 53, and a cache memory 63.

The common memory card (CM) 53 has a common memory 71 comprising a RAM, and a common-memory controller (CM controller) 72. The common memory 71 has a data storage section GM equipped with a number of data storage areas A to N, and a semaphore register (exclusive control data storage section) semf for retaining whether respective ones of the storage areas A to N are presently in use or not as well as the names of processors presently in use. A storage area J corresponding to semf-j in which a busy flag has been set cannot be accessed by another processor.

The cache memory 63 of each processor has a size same as that of the common memory 71 of common memory card CM and is capable of storing the same information.

That is, in a manner similar to that of the common memory 71, the cache memory 63 has ① a data storage section GM (a GM cache) equipped with a number of data storage areas A to N, and ② a semaphore register (semaphore cache) semf for retaining whether respective ones of the storage areas are presently in use or not as well as the names of processors presently in use.

Figure 11:
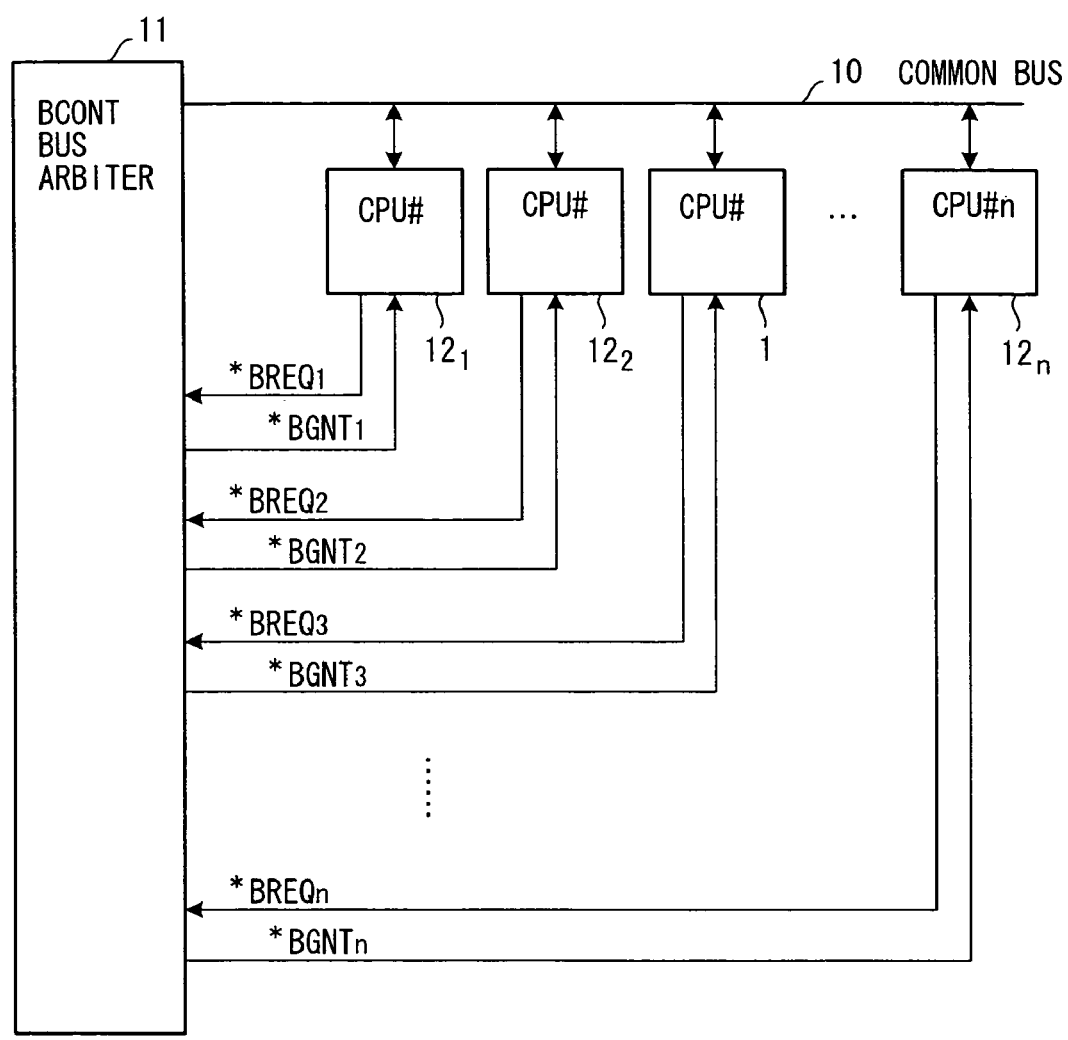
FIG. 11 is a diagram showing the connection between a bus arbiter and each of a number of processors.
Figure 12:
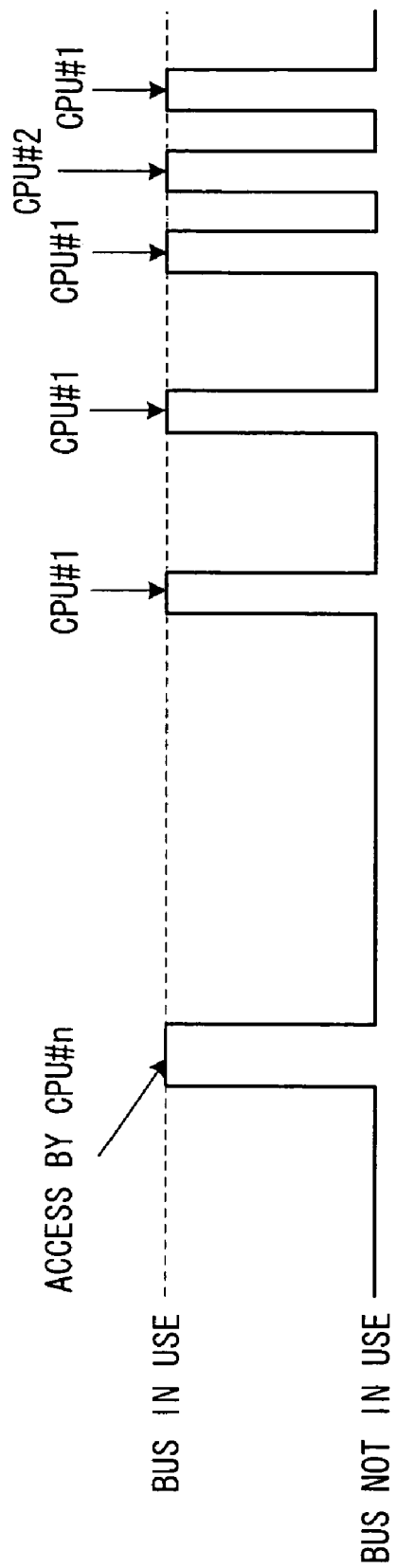
FIG. 12 is a diagram useful in describing the number of times a bus is accessed (the number of times the bus is used) according to the prior art.
Figure 13:
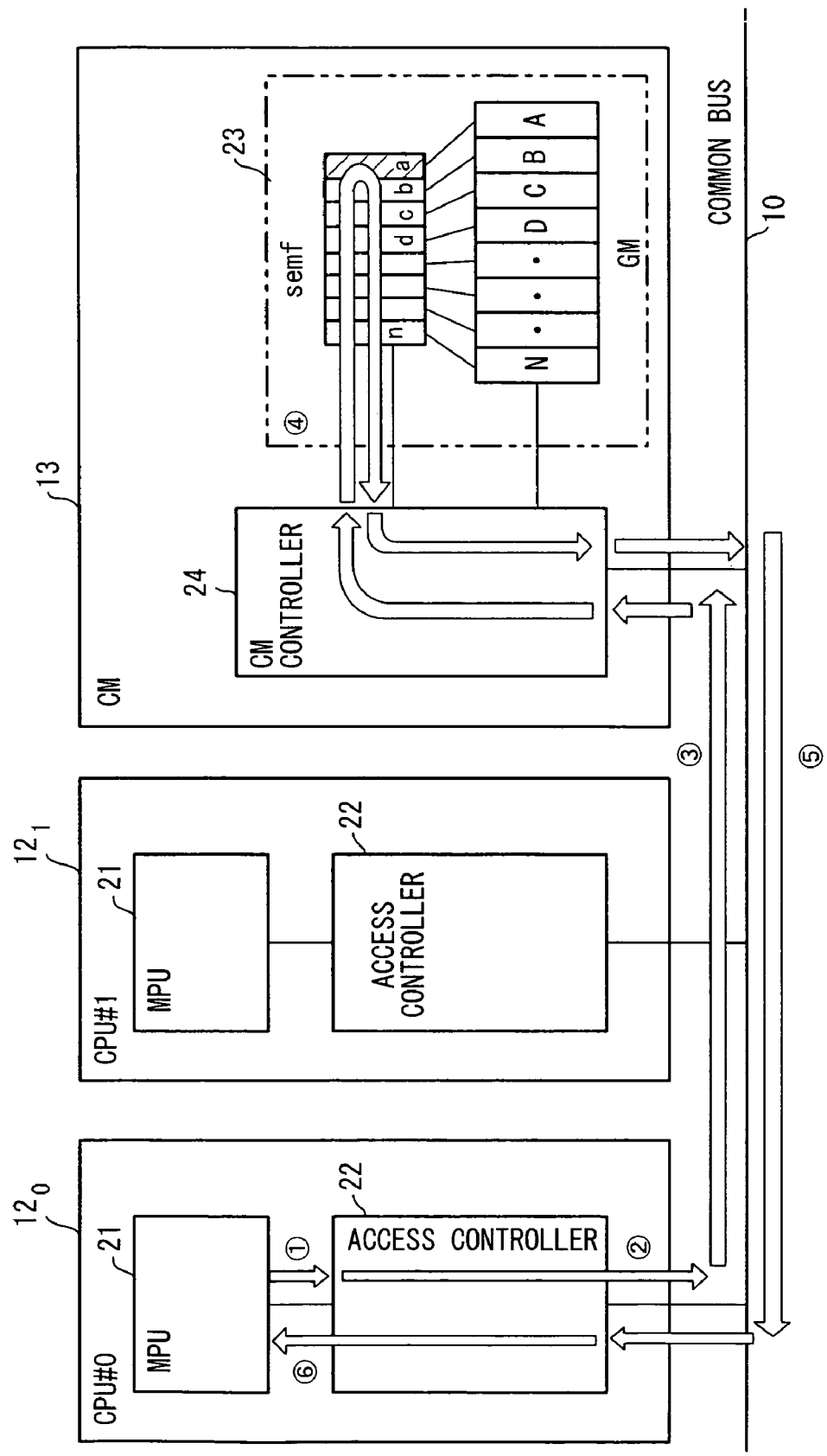
FIG. 13 is a diagram useful in describing first access control for accessing a common memory card CM according to the prior art.
Figure 14:
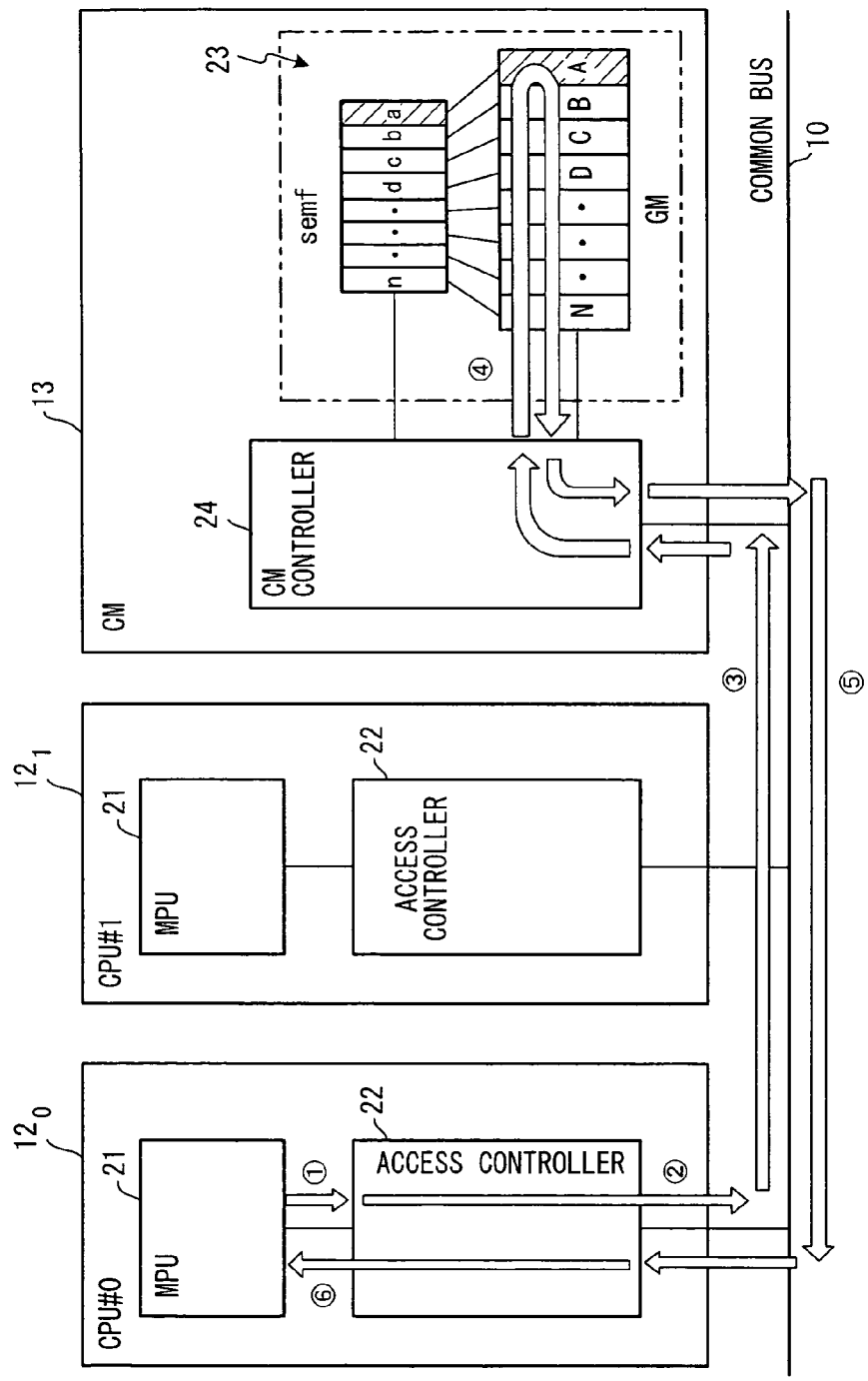
FIG. 14 is a diagram useful in describing second access control for accessing the common memory card CM according to the prior art.
Figure 15:
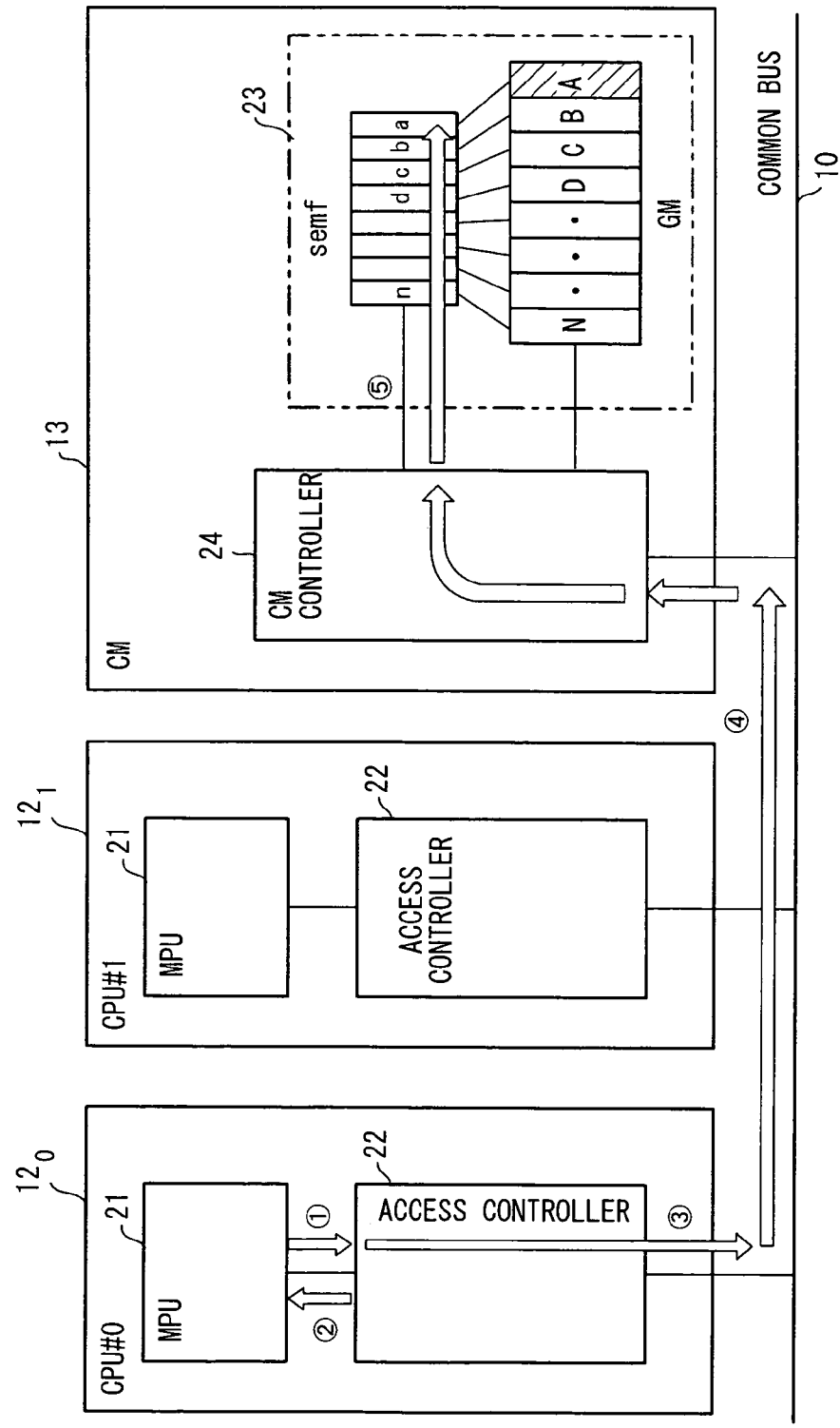
FIG. 15 is a diagram useful in describing third access control for accessing the common memory card CM according to the prior art.
Figure 16:
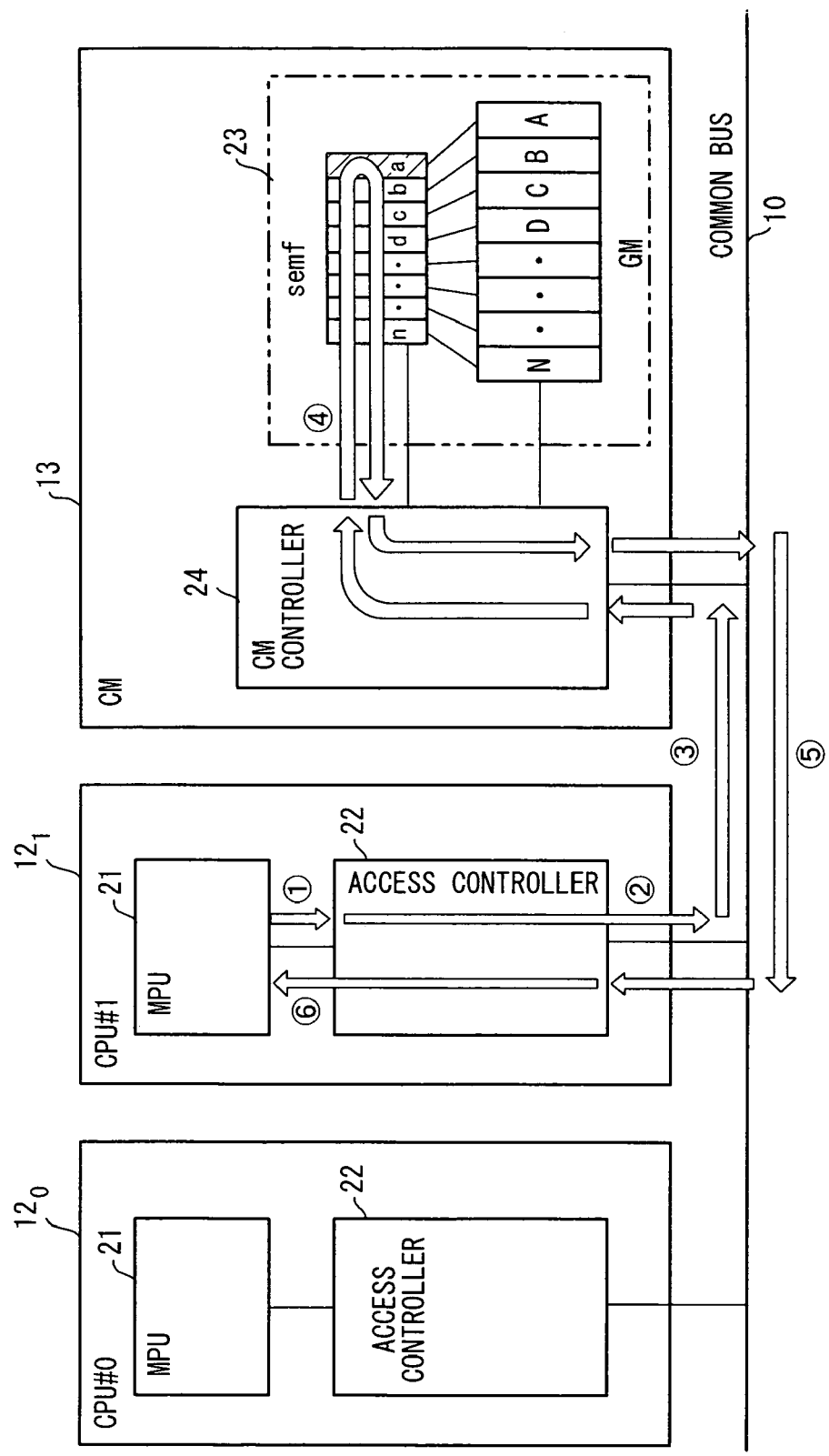
FIG. 16 is a diagram useful in describing fourth access control for accessing the common memory card CM according to the prior art.
Figure 17:
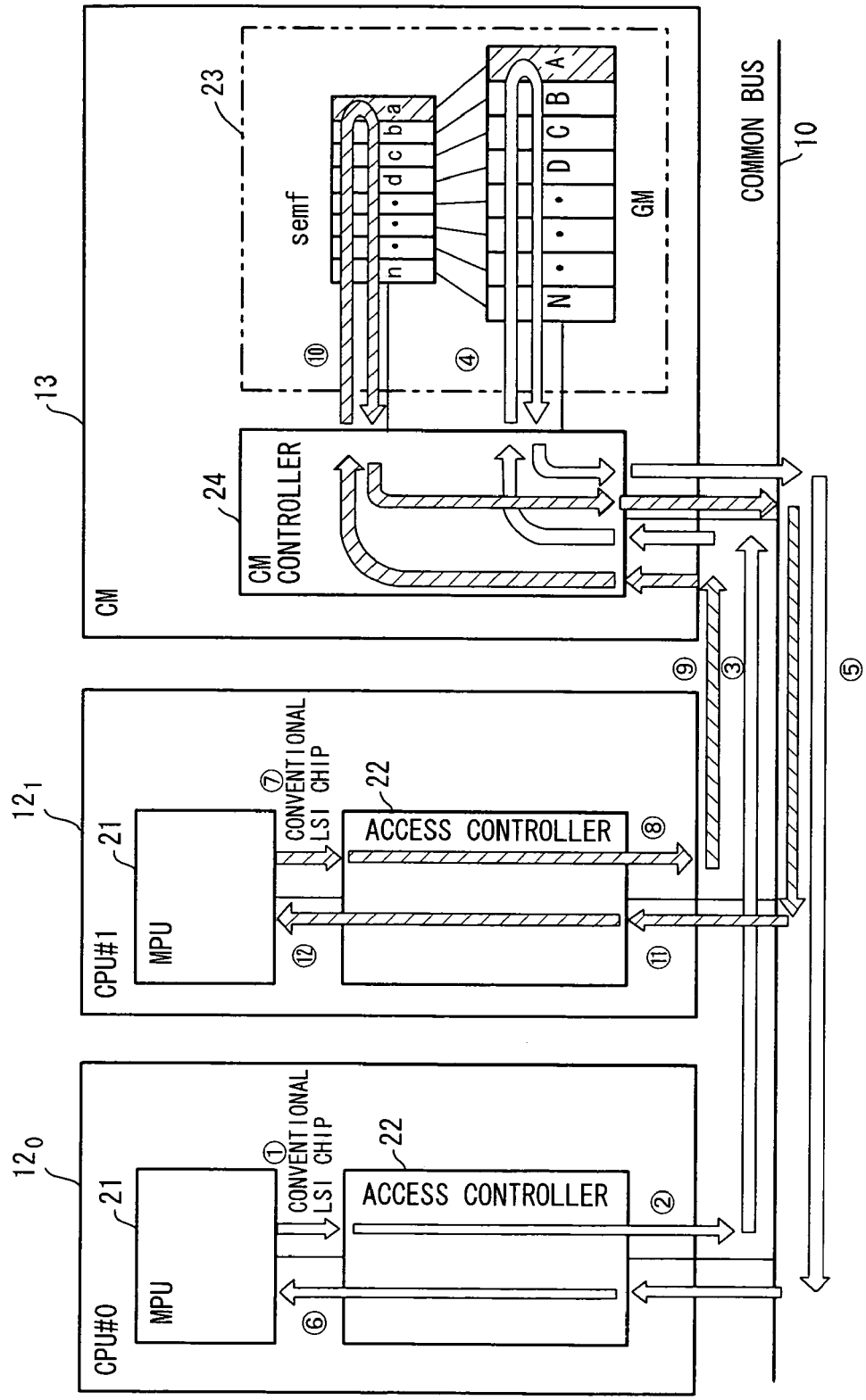
FIG. 17 is a diagram useful in describing fifth access control for accessing the common memory card CM according to the prior art.

The bus arbiter 51 and the processors CPU #1 to CPU #n are connected by respective ones of signal lines in a manner similar to that of the prior art (FIG. 11). When the bus is not in use, each processor requests the privilege to use the bus by sending a bus-use request signal *BREQJ from its signal line to the bus arbiter 51. If the right to use the bus is to be given to a prescribed processor, the bus arbiter 51 sends a bus-use enable signal *BGNTj to this processor. It is required that a processor output a bus busy signal *BB during a data transfer. Other buses refer to the bus busy signal *BB and cannot use the bus if it is busy.

(b) General Operation of the Present Invention

The general operation of the present invention will now be described. By way of example, it will be assumed that the CM controller 72 has granted the CPU #n the right to access data storage area a. In this case, the CM controller 72 sends, over the common bus 50, write access for writing management information (busy flag and busy-processor name) to semf-a of the semaphore register semf in the common memory card 53 and writing the management information to semf-a of a semaphore cache 63b in CPU #n. The access controller (dedicated LSI chip) 62 of CPU #n accepts this management information and writes this information to semf-a of the semaphore cache 63b. At this time the other CPUs #1 to #n-1 perform monitoring to determine whether address/data is flowing on the common bus. The CPU takes the address/data, accepts it just as if it were write data directed to itself and stores it in semf-a of the semaphore cache 63b of its own cache memory 63. A similar operation is performed also in a case where semaphore semf-a is relinquished. Accordingly, the content of the semaphore registers in all CPUs #1 to #n and in the common memory card is entirely the same.

The CPU #n performs the following control when data is read out of the data storage area GM-A of common memory card 53: Specifically, when CPU #n accesses the common memory card 53 for read, the common memory card 53 reads data out of the common memory 71 and sends it to the common bus 50. The CPU #n receives the data via the common bus 50, inputs the data to the internal MPU 61 and stores the data in data area GM-A of a GM cache 63a in cache memory 63. At this time the other CPUs #1 to #n-1 perform monitoring to determine whether address/data is flowing on the common bus. The CPU takes this address/data and stores it in the data area GM-A of GM cache 63a in its own cache memory 63.

Further, the CPU #n performs the following control when data is written to the data area GM-A of common memory card 53: Specifically, the CPU #n accesses the common memory card 53 for write via the common bus 50 and writes data regarding write access to the data area GM-A of GM cache 63a in its own cache memory 63. Further, the CM controller 72 of common memory card 53 writes the data to the data area GM-A of common memory 71 by this write access. At this time the other CPUs #1 to #n perform monitoring to determine whether address/data is flowing on the common bus. The processor takes this address/data and stores it in the data area GM-A of GM cache 63a in its own cache memory 63.

By virtue of the above operation, the content of all CPUs #1 to #n and in the data storage area GM of the common memory card is the same.

Accordingly, if each of the CPUs #1 to #n refers to its own semaphore register semf, the CPUs can identify whether or not the data storage areas A to N are busy. It is no longer necessary for these CPUs to refer to the semaphore register of the common memory card via the common bus, as is done in the prior art, and therefore the number of times access is performed can be reduced.

Further, if a CPU that has obtained the right to access a data storage area GM-j achieves a hit, it can read data out of the data storage section of its own cache memory without accessing the common memory card. This makes it possible to reduce the number of times the common memory card is accessed so that the capability of each processor can manifest itself fully.

(c) Detailed Operation of the Present Invention

Figure 2:
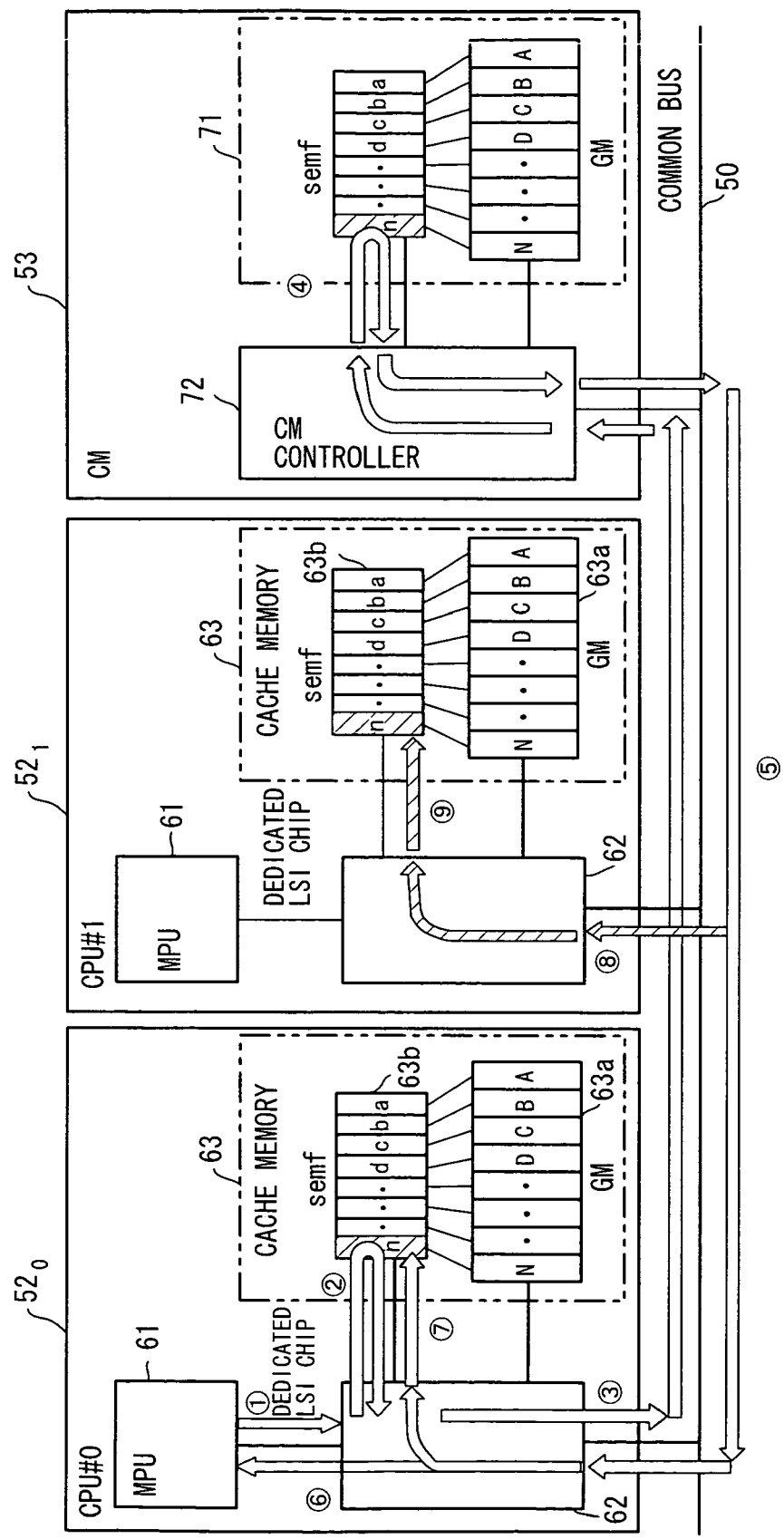
FIG. 2 is a diagram useful in describing processing through which a CPU #0 acquires the right to access a prescribed data area (data area GM-N)

FIG. 2 is a diagram useful in describing processing through which CPU #0 acquires the right to access a prescribed data area (data area N). It should be noted that identical addresses are allocated to the cache memory 63 of each of the CPUs #0 to #1 and to the common memory 71.

① The MPU 61 within CPU #0 generates a read access for the purpose of semaphore acquisition. The target at this time is semf-n in common memory card CM.

② Upon receiving the access request of step ①, the access controller (dedicated LSI chip) 62 reads the status of the applicable address out of the semaphore cache 63b within CPU #0. If the result of read-out is that other CPUs are not in use, i.e., if a vacancy is found, then the dedicated LSI chip 62 sends reads access to the common bus 50 and waits for result of acquisition of semf-n to be sent back from the common memory card CM.

③ The CM controller 72 receives the read access sent on the common bus and reads out the data of semf-n pertaining to this access.

④ If the read-out data of semf-n is not in use, then the CM controller 72 creates management information such that CPU #0, which is the source of the current access, will be rendered busy, and writes the information back to semf-n. As a consequence, semf-n attains a state indicating that CPU #0 is busy. It should be noted that the management information contains busy-flag data and the name of the processor in use.

⑤ The CM controller 72 sends the management information, which was written back to semf-n, and a cache address on the common bus 50 as loop data. The loop data indicates that acquisition by CPU #0 has succeeded.

⑥ The dedicated LSI chip 62 of CPU #0 receives the data sent back on the common bus and relays it to the MPU 61. At this time the CPU #0 will have acquired the right to access data area GM-A.

⑦ Further, the dedicated LSI chip 62 also writes the data (management information) prevailing at this time to semf-n of semaphore cache 63b designated by the address. As a result, the semaphore cache indicates that CPU #0 is busy. At this time the content of semf-n in CPU #0 and the content of semf-n in the common memory card CM agree.

⑧ Meanwhile, CPU #1, which is a CPU other than CPU #0, monitors addresses and data, etc., being sent on the common bus at step ⑤. The access prevailing at this time is taken and is received also by the dedicated LSI chip 62 in CPU #1.

⑨ The dedicated LSI chip 62 in CPU #1 writes the accepted data to semf-n of semaphore cache 63b designated by the address. At this time, the areas semf-n in CPU #0, in CPU #1 and in common memory card CM all have the same content.

Figure 3:
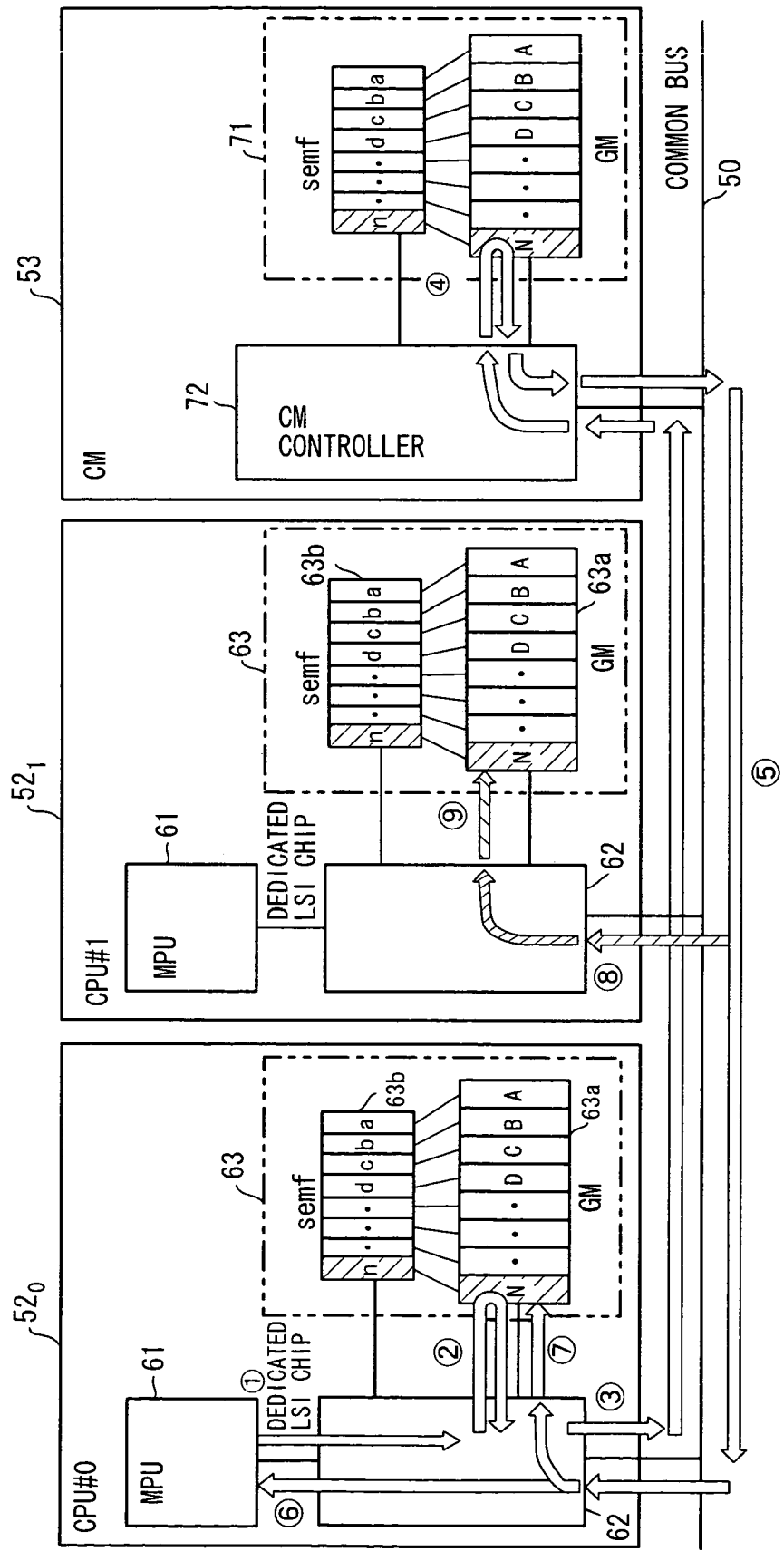
FIG. 3 is a diagram useful in describing processing through which the CPU #0 accesses the data area GM-N in a state in which the right to access the data area GM-N has been acquired by the CPU #0.

FIG. 3 is a diagram useful in describing processing through which the CPU #0 accesses the data area GM-N in a state in which semf-n (the right to access data area GM-N) has been acquired by CPU #0 and the areas semf-n in CPU #0, in CPU #1 and in common memory card CM all have the same content.

① The MPU 61 of CPU #0 starts executing processing. If it becomes necessary to read data from or write data to data area GM-N in the course of processing, then the MPU 61 outputs access to the data area GM-N.

② The dedicated LSI chip 62 of CPU #0 receives the access of step ① and reads the status of the applicable address out of the GM cache 63a in CPU #0. It should be noted that although FIG. 3 does not show the area that stores the status of the address, status information indicating whether the data of each address is valid or invalid is held in this area.

If the result of read-out is that the data of the applicable address is not valid, then the dedicated LSI chip 62 sends read access to the common bus 50 and waits for return of data from the data area GM-N of common memory card CM.

If the status information read out of the GM cache 63a indicates validity of data, then data is read out of the data area GM-N of GM cache 63a, the data is input to the MPU 61 and processing ends.

③ If the data is invalid and the dedicated LSI chip 62 sends read access to the common bus 50, then the CM controller 72 receives the read access sent on the common bus.

④ Next, the CM controller 72 reads out the data of the applicable data area GM-N.

⑤ The CM controller 72 sends the read-out data of data area GM-N and the address of data area GM-N on the common bus as loop data.

⑥ The dedicated LSI chip 62 in CPU #0 receives the data sent back on the common bus and relays it to the MPU 61.

⑦ Further, the dedicated LSI chip 62 in CPU #0 also writes the data prevailing at this time to the data area GM-N of GM cache 63a designated by the address. At this time the content of data area GM-N in CPU #0 agrees with the content of data area GM-N in the common memory card CM.

⑧ Concurrently with the foregoing, CPU #1, which is a CPU other than CPU #0, monitors addresses and data, etc., being sent on the common bus at step 5̃. The access prevailing at this time is taken and is received also by the dedicated LSI chip 62 in CPU #1.

⑨ The dedicated LSI chip 62 in CPU #1 accepts the data of data area GM-N sent on the common bus and writes it to the data area GM-N in GM cache 63a designated by the address. At this time; the data areas GM-N in CPU #0, in CPU #1 and in common memory card CM all have the same content.

Thenceforth, and in similar fashion, access on the common bus is monitored by the dedicated LSI chip 62 in each CPU, as a result of which agreement is achieved among the content of all data storage areas GM-N in CPU #0, CPU #1 and common memory card CM.

Figure 4:
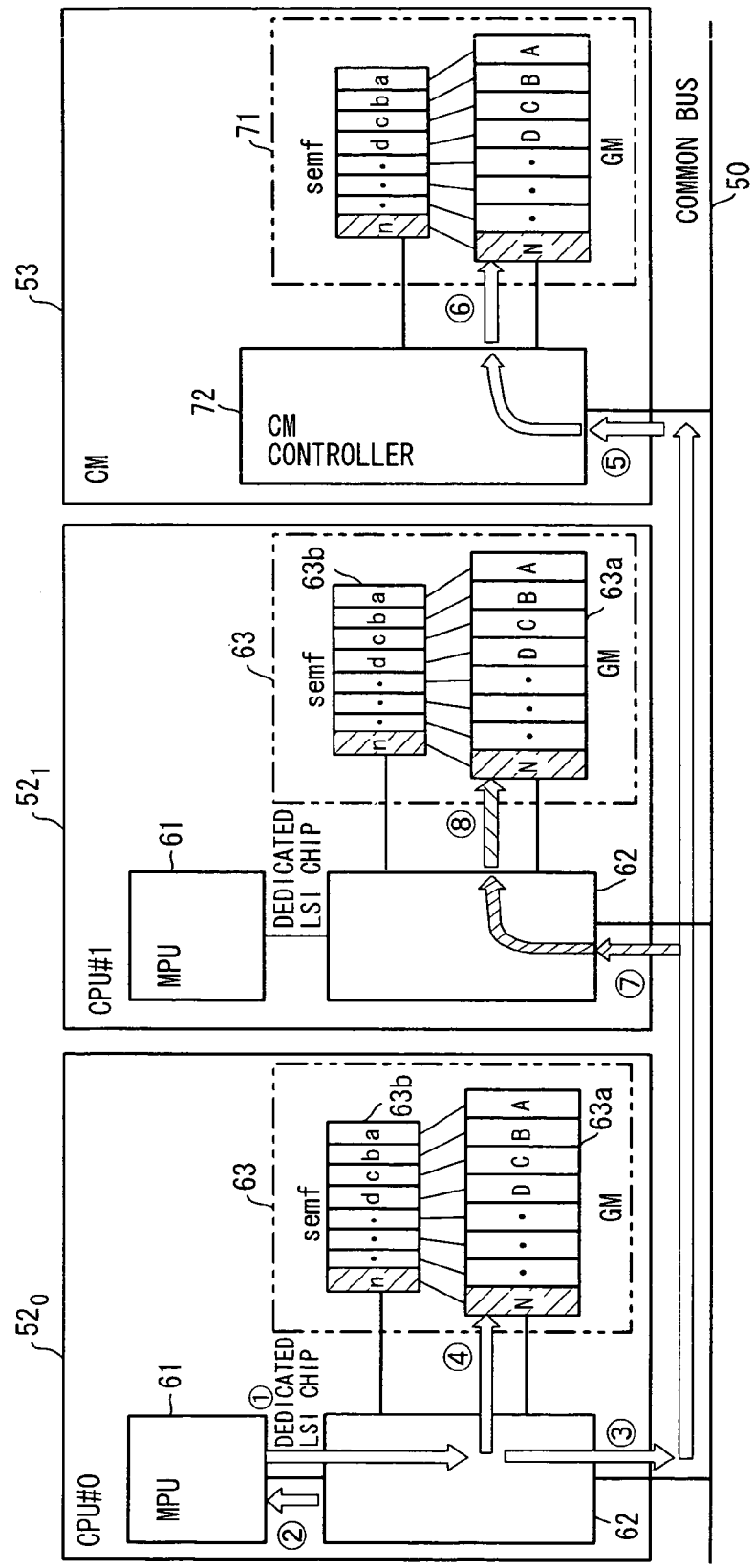
FIG. 4 is a diagram useful in describing processing for writing data to a data-storage area GM.

FIG. 4 illustrates processing for writing data to the data storage area GM.

① CPU #0 starts executing processing. If it becomes necessary to write data to data area GM-N in the course of processing, then the MPU 61 outputs write access to the data area GM-N.

② When it receives this access, the dedicated LSI chip 62 of CPU #0 answers the MPU 61 normally and completes processing for communication with the MPU. In actuality, the dedicated LSI chip 62 continues with post-processing because processing for writing to the data area GM-N in common memory card CM has not been completed.

③ The dedicated LSI chip 62 sends the data to be written to the data area GM-N and the address of the data area GM-N on the common bus.

④ At the same time that step ③ is executed, the dedicated LSI chip 62 reads the status of the applicable address out of the GM cache 63a in CPU #0. In the case of write, the dedicated LSI chip 62 writes the write data to the data area GM-N in GM cache 63a of CPU #0 irrespective of whether the data of the applicable address is valid or invalid.

⑤ The CM controller 72 receives the data sent on the common bus.

⑥ Next, the CM controller 72 writes the write data to the data area GM-N corresponding to the applicable address received.

⑦ Meanwhile, CPU #1, which is other than CPU #0, monitors addresses and data, etc., being sent on the common bus at step ③. The access prevailing at this time is taken and the dedicated LSI chip 62 in CPU #1 accepts this address and data.

⑧ The dedicated LSI chip 62 in CPU #1 writes the data that was taken to data area GM-N of GM cache 63a designated by the address. At this time, the data areas GM-N in CPU #0, in CPU #1 and in common memory card CM all have the same content.

Thereafter, whenever processing for writing from CPU #0 occurs, steps ① to ③ are repeated and the data in data area GM-N is updated.

Access on the common bus thenceforth is monitored by the dedicated LSI chip in each CPU, as a result of which agreement is achieved among the content of each GM cache 63a and the data storage area GM of the common memory card.

Figure 5:
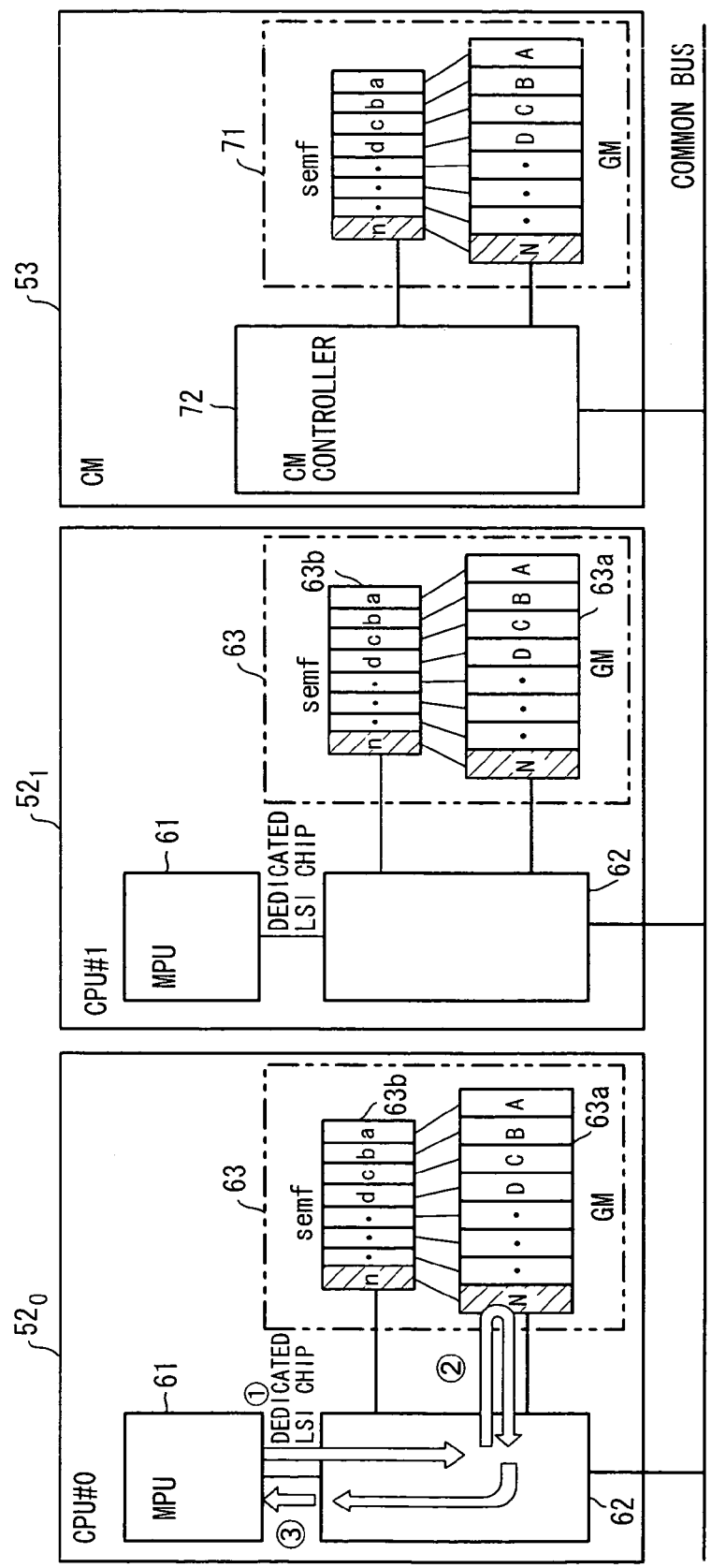
FIG. 5 is a diagram useful in describing processing in a case where read-out from the data storage area GM of a common memory card results in a hit in a GM cache within CPU #0.

FIG. 5 is a diagram useful in describing processing in a case where read-out from the data storage area GM of a common memory card results in a hit in the GM cache 63a within CPU #0.

① CPU #0 starts executing processing. If it becomes necessary to read data out of area GM-N in the course of processing, then the MPU 61 outputs read access to the data area GM-N.

② When it receives this access, the dedicated LSI chip 62 of CPU #0 reads the status of the applicable address out of the GM cache 63a in CPU #0.

③ If the data read out is valid, the dedicated LSI chip 62 sends this data back to the MPU 21 and completes read access. In this case, access to the common bus is cancelled since read access directed to the common memory card CM is unnecessary.

Figure 6:
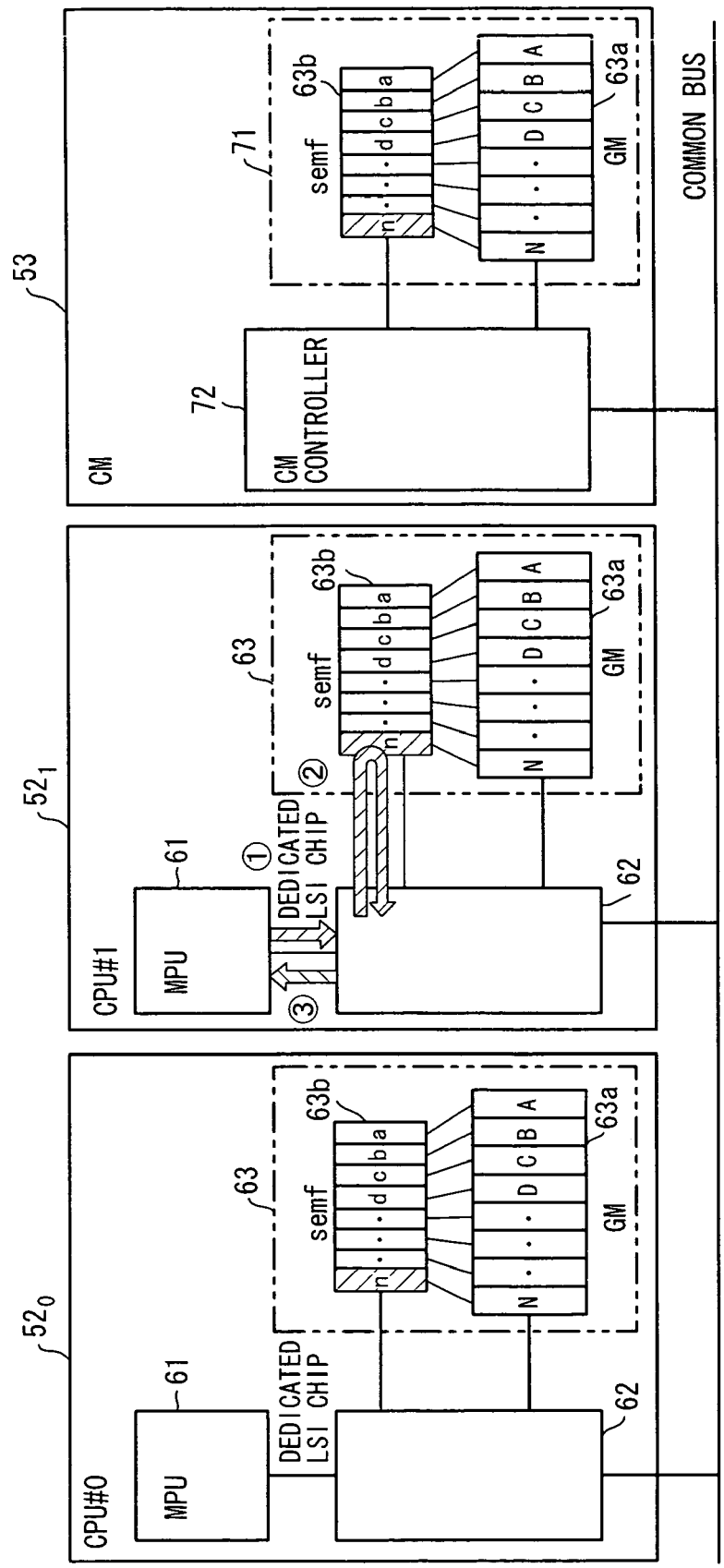
FIG. 6 is a diagram useful in describing processing in a case where semaphore-acquisition access of semf-n by a CPU #1 occurs while CPU #0 is using data area GM-N corresponding to semf-n.

FIG. 6 illustrates processing in a case where semaphore-acquisition access of semf-n by CPU #1 occurs while CPU #0 is using data area GM-N corresponding to semf-n in semaphore register 63b.

① CPU #0 outputs semaphore-acquisition access with respect to semf-n. At this time, semf-n is already being used by CPU #0.

② The dedicated LSI chip 62 of CPU #1 reads semf-n out of the address of semaphore cache 63b applicable to the semaphore-acquisition access received and recognizes that CPU #0 is busy.

③ The dedicated LSI chip 62 of CPU #1 sends data indicative of semaphore-acquisition access failure back to the MPU 61. At this time the dedicated LSI chip 62 of CPU #1 cancels access to the common bus since semaphore-acquisition access directed to the common memory card CM becomes unnecessary.

The MPU 61 of CPU #1 thenceforth repeats the operation of steps ① to ③ until use by CPU #0 ends and semaphore access succeeds. During this period of time, retry access when semaphore acquisition fails is not transmitted on the common bus.

Thus, in accordance with the first embodiment, a processor that has not acquired the right to access a prescribed data area can ascertain whether another processor is using this data area merely be referring to its internal information. This means that it is unnecessary to query the common memory card via the common bus each time, as is done in the prior art, thereby allowing processor throughput to be raised and making it possible to acquire results in a short period of time.

Further, in accordance with the first embodiment, a processor that has acquired the right to access a prescribed data area need not access the common memory card if a hit is achieved in its own cache. This data can be read out and processed at high speed, enabling the throughput of the processor to be improved. Further, if a processor that does not possess access privilege is prohibited from writing data and reading of data is made possible, then another processor can read and process data at high speed without the need to access the common memory card if a hit is achieved in its own internal cache. This makes it possible to raise the throughput of the processor.

Further, since the common bus can be made to assume the busy state less often, a processor that has acquired access privilege is capable of reading data out of the common memory and writing data to the common memory at high speed.

(B) Second Embodiment

Figure 7:
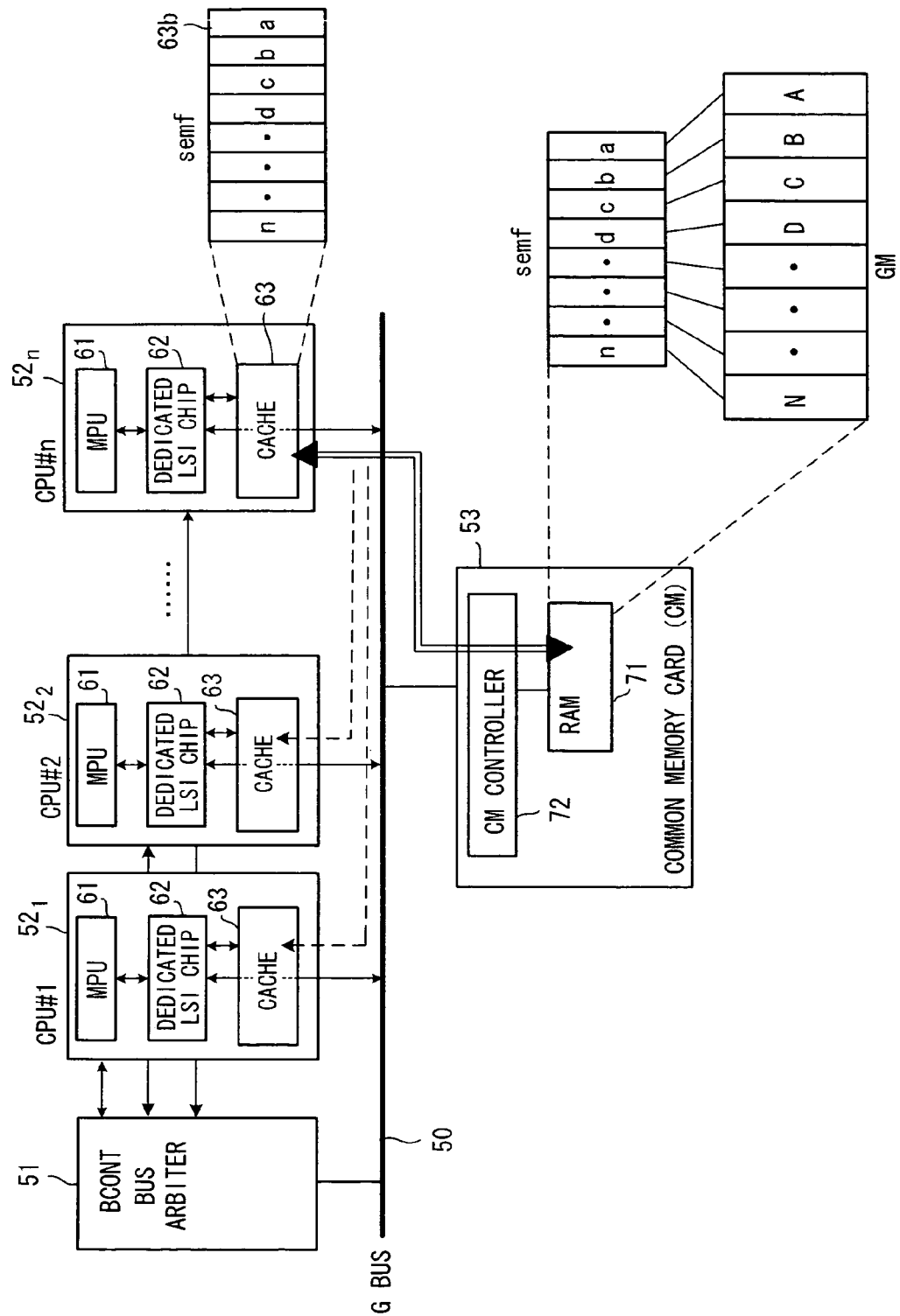
FIG. 7 is a diagram showing the configuration of a second embodiment of the present invention.

FIG. 7 is a diagram illustrating the configuration of a second embodiment of the present invention. Components identical with those of the first embodiment in FIG. 1 are designated by like reference characters. This embodiment differs from the first embodiment in that the cache memory 63 is provided with the semaphore cache 63b only and the GM cache 63a is deleted.

The second embodiment is such that when management information (busy-flag data and processor name) to be written to the semaphore cache 63b has been transmitted over the common bus 50 (see FIG. 2), another processor that does not have access privilege takes this data and stores it in the semaphore cache 63b.

In accordance with the second embodiment, a processor that has not acquired the right to access a data area can determine that another processor is using this data area merely by referring to its internal information. This is performed in a manner similar to that shown in FIG. 6 of the first embodiment. As a result, it is unnecessary to query the common memory via the common bus each time, as is done in the prior art, thereby making it possible to raise the throughput of the processor and enable results to be acquired in a short period of time.

(C) Third Embodiment

Figure 8:
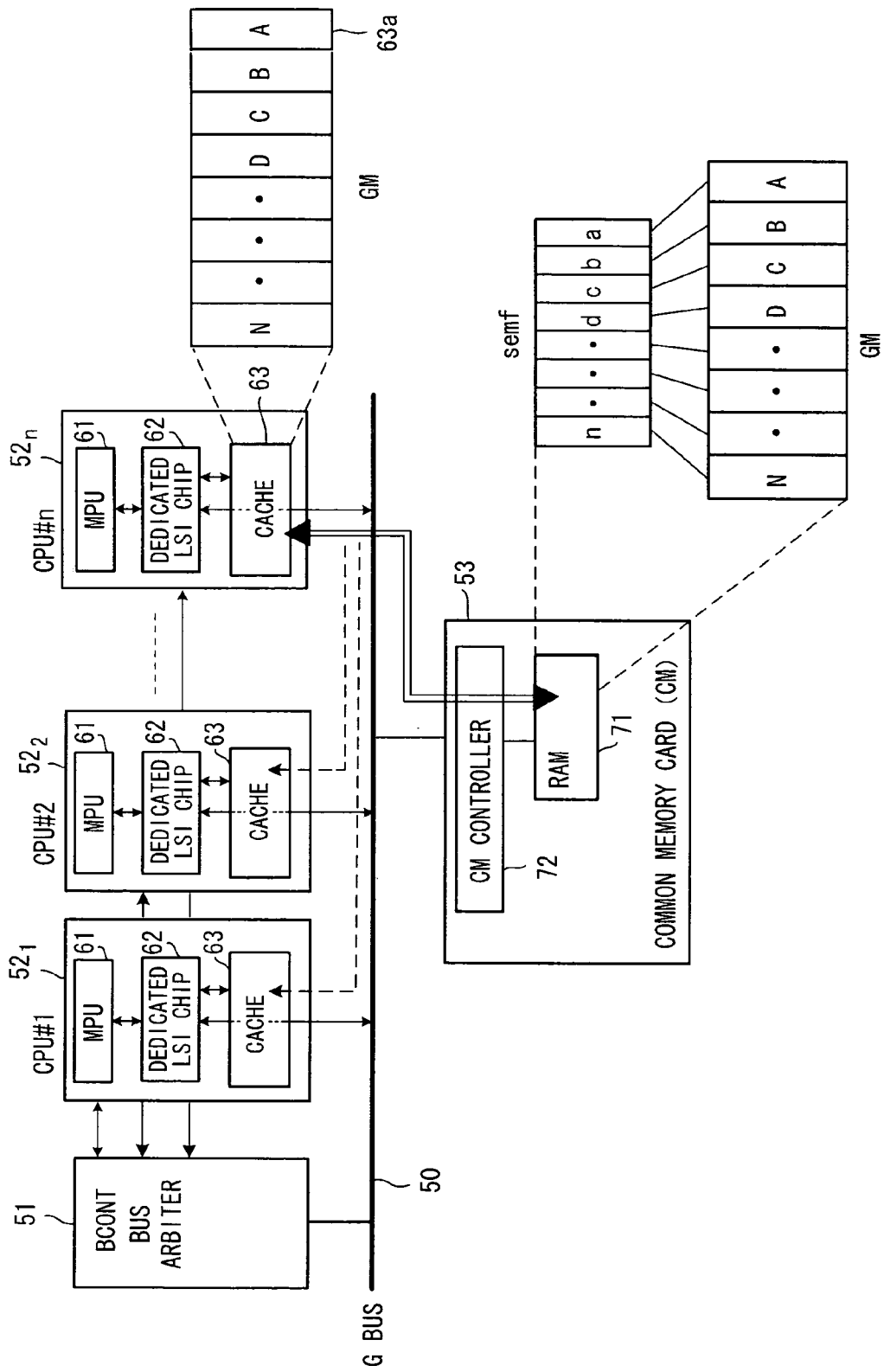
FIG. 8 is a diagram showing the configuration of a third embodiment of the present invention.
Figure 9:
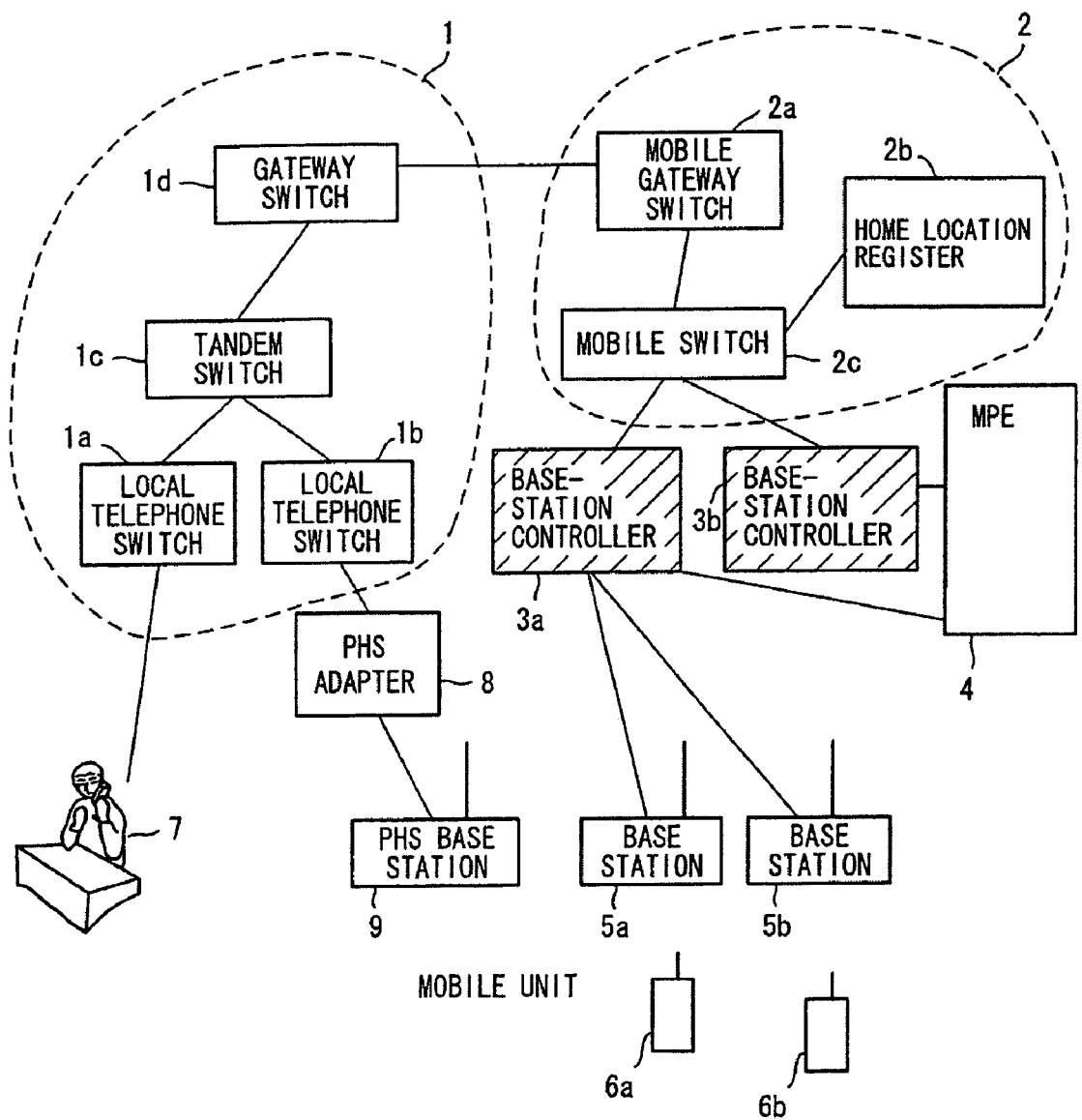
FIG. 9 is a diagram showing the configuration of a mobile communications system.
Figure 10:
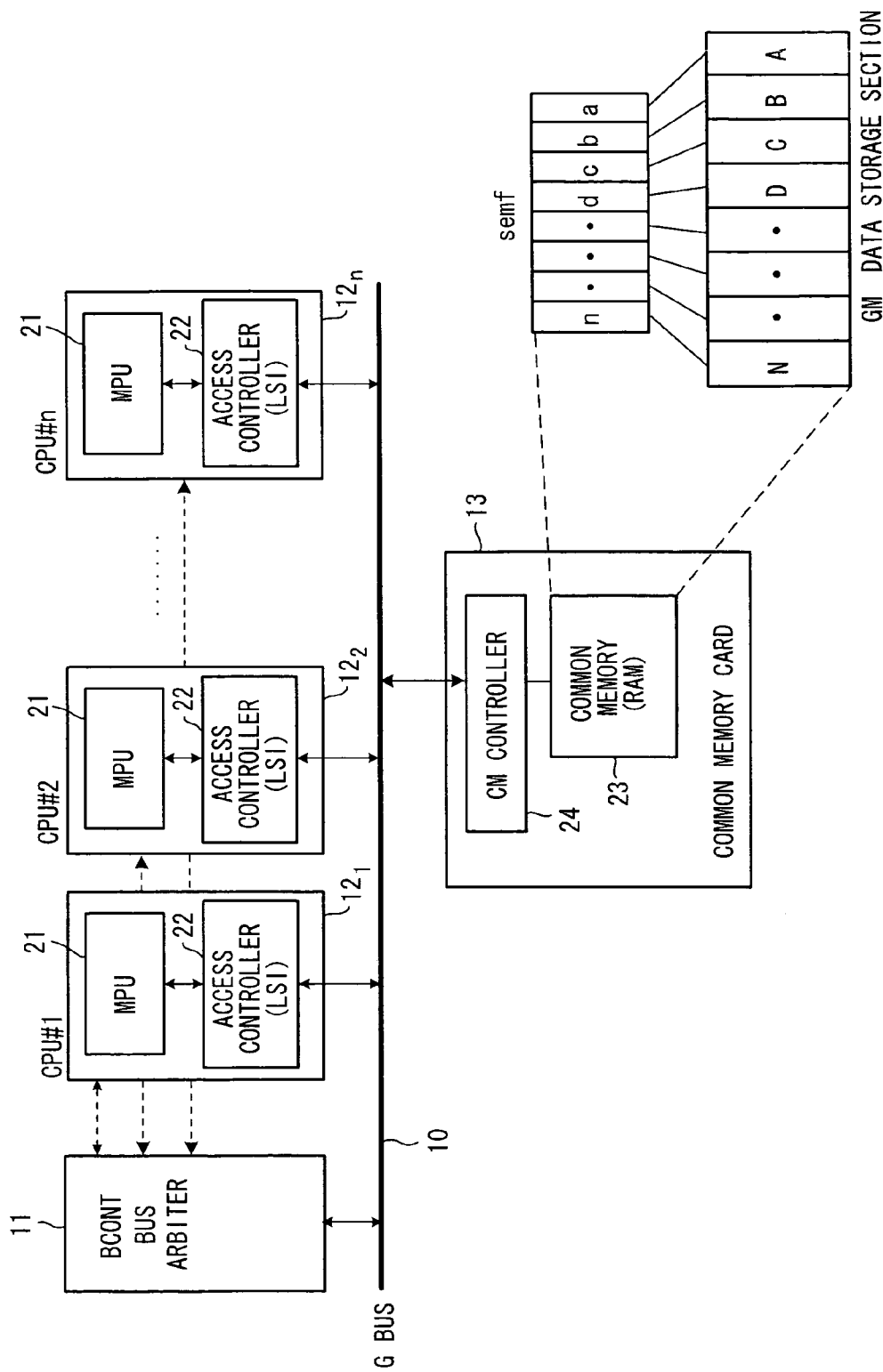
FIG. 10 is a diagram illustrating the multiprocessor structure of a base station controller according to the prior art.

FIG. 8 is a diagram illustrating the configuration of a third embodiment of the present invention. Components identical with those of the first embodiment in FIG. 1 are designated by like reference characters. This embodiment differs from the first embodiment in that the cache memory 63 is provided with the GM cache 63a only and semaphore cache 63b is deleted.

The third embodiment is such that when data to be written to the GM cache 63a has been transmitted over the common bus 50 (see FIGS. 3 and 4), another processor that does not have access privilege takes this data and stores it in the GM cache 63a.

In accordance with the third embodiment, a processor that has acquired the right to access a data area need not access the common memory card if a hit is achieved in its own internal cache. This data can be read out and processed at high speed, thereby enabling the throughput of the processor to be improved.

Further, if a processor that does not possess access privilege is prohibited from writing data and reading of data is made possible, then another processor can read and process data at high speed without the need to access the common memory if a hit is achieved in its GM cache 63a. This makes it possible to raise the throughput of the processor.

(D) Modification

In the first embodiment of FIG. 1, the common memory card 53 remains. However, if the storage units 63 in each of the processors are all made the same in content and all of the stored content is made valid at the start, then the common memory card 53 can be eliminated. In this case, if the processor CPU #n having the access privilege is to write data to a common memory card (which does not actually exist), then the CPU writes this data to its own storage unit 63 and sends the data and address to the common bus 50. The other processors CPU #1 to CPU #n-1 accept the data and address on the common bus and write the same to its own storage unit 63.

Thus, in accordance with the present invention, a processor that has not acquired the right to access a prescribed data area can ascertain whether another processor is using this data area merely by referring to its own internal information. This means that it is unnecessary to query a common memory via a common bus each time, as is done in the prior art, thereby allowing processor throughput to be raised and making it possible to acquire results in a short period of time.

Further, in accordance with the present invention, a processor that has acquired the right to access a prescribed data area need not access the common memory if a hit is achieved in its own internal cache. This data can be read out of the storage unit and processed at high speed, enabling the throughput of the processor to be improved.

Further, in accordance with the present invention, if a processor that does not possess access privilege is prohibited only from writing data and reading of data is made possible, then another processor can read and process data at high speed without the need to access the common memory if a hit is achieved in its own internal cache.

Further, in accordance with the present invention, the common bus can be made to assume the busy state less often. As a consequence, a processor that has acquired access privilege is capable of reading data out of the common memory and writing data to the common memory at high speed.

As many apparently widely different embodiments of the present invention can be made without departing from the spirit and scope thereof, it is to be understood that the invention is not limited to the specific embodiments thereof except as defined in the appended claims.

What is claimed is:

1. A multiprocessor system comprising a common memory and a number of processors connected via a common bus, only one processor being allowed to access same data area of said common memory at a time, wherein:
   said common memory is provided with a number of data areas that store data mad with a control information area that stores control information indicating whether each of the data areas is in use;
   each processor is provided with a storage unit for storing same data and same control information as those stored in the common memory and with an access controller;
   the access controller of a processor that does not have access privilege monitors data and addresses that flow on the common bus, accepts, from the common bus, data written to said common memory and data lead from said common memory and stores this data in a memory area, which is designated by an address, of the storage unit within its own processor; and
   wherein when access to a prescribed data area in said common memory is requested by a host apparatus, the access controller of each processor reads control information corresponding to this data area in said storage unit, determines whether another processor is busy and, if another processor is busy, inputs result of the determination to the host apparatus without accessing said common memory.

2. The system according to claim 1, wherein identical addresses are allocated to address spaces of the storage unit of each processor and of the common memory, and the access controller of a processor that does not have access privilege writes data on the common bus to a storage area of a storage unit designated by an address on the common bus.

3. The system according to claim 1, wherein if, when read-out of data from a prescribed data area in said common memory is commanded by a host apparatus, said data area in said storage unit is valid, then the access controller of a processor that has access privilege reads data from this data area and inputs the data to the host apparatus.

4. The system according to claim 2, wherein when writing of data to a prescribed data area in said common memory is commanded by the host apparatus, the access controller of a processor that has access privilege writes data to a data area of said storage unit and sends this data as well as an address corresponding to this data area to the common bus.

5. A multiprocessor system comprising a common memory and a number of processors connected via a common bus, only one processor being allowed to access same data area of said common memory at a time, wherein:
   said common memory is provided with a number of data areas that store data and with a control information area that stores control information indicating whether each of the data areas is in use;
   each processor is provided with a storage unit for storing same control information as that stored in said control information area and with an access controller; and
   the access controller of a processor that does not have access privilege monitors control information and addresses that flow on the common bus, accepts this control information from the common bus and stores it in a memory area, which is designated by an address, of the storage unit within its own processor; and
   wherein when access to a prescribed data area in said common memory is requested by a host apparatus, the access controller of each processor reads control information corresponding to this data area in said storage unit, determines whether another processor is busy and, if another processor is busy, inputs result of the determination to the host apparatus without accessing said common memory.

6. The system according to claim 5, wherein identical addresses are allocated to the storage unit of each processor and to a control information area of the common memory, and the access controller of a processor that does not have access privilege accepts the control information on the common bus and writes it to a storage area of a storage unit designated by an address on the common bus.

7. A multiprocessor system comprising a common memory and a number of processors connected via a common bus, only one processor being allowed to access same data area of said common memory at a time, wherein:
   said common memory is provided with a number of data areas that store data and with a control information area that stores control information indicating whether each of the data areas is in use;
   each processor is provided with a storage unit for storing same data as that stored in said data area and with an access controller;
   the access controller of a processor that does not have access privilege monitors data and addresses that flow on the common bus, accepts this data from the common bus and stores it in a memory area, which is designated by an address, of the storage unit within its own processor; and
   wherein when access to a prescribed data area in said common memory is requested by a host apparatus, the access controller of each processor reads control information corresponding to this data area in said storage unit, determines whether another processor is busy and, if another processor is busy, inputs result of the determination to the host apparatus without accessing said common memory.

* * * * *